United States Patent
Kohno et al.

[11] Patent Number: 6,082,427
[45] Date of Patent: Jul. 4, 2000

[54] HEAVY DUTY PNEUMATIC RADIAL TIRES WITH SPECIFIED COATING RUBBER OF OUTERMOST BELT LAYER

[75] Inventors: Yoshihide Kohno, Kodaira; Yoichi Okamoto, Kawagoe, both of Japan

[73] Assignee: Bridgestone Corporation, Tokyo, Japan

[21] Appl. No.: 09/039,313

[22] Filed: Mar. 16, 1998

[30] Foreign Application Priority Data

Mar. 17, 1997 [JP] Japan ..................... 9-062840

[51] Int. Cl.$^7$ .................. B60C 1/00; B60C 9/18; B60C 9/20
[52] U.S. Cl. .................. 152/532; 152/526; 152/534; 152/537
[58] Field of Search .................. 152/526, 532, 152/534, 535, 537

[56] References Cited

U.S. PATENT DOCUMENTS

| | | | |
|---|---|---|---|
| 3,131,744 | 5/1964 | Boussu et al. | 152/537 X |
| 4,161,203 | 7/1979 | Suzuki et al. | |

FOREIGN PATENT DOCUMENTS

| | | |
|---|---|---|
| 0 785 095 A1 | 7/1997 | European Pat. Off. |
| 1 505 094 | 3/1969 | Germany. |
| 7-186613 | 7/1995 | Japan. |
| 628 060 | 8/1949 | United Kingdom. |
| 1 058 809 | 2/1967 | United Kingdom. |
| 2 072 590 | 10/1981 | United Kingdom. |

*Primary Examiner*—Adrienne C. Johnstone
*Attorney, Agent, or Firm*—Sughrue, Mion, Zinn, Macpeak & Seas, PLLC

[57] ABSTRACT

A heavy duty pneumatic radial tire comprises a radial carcass extending between a pair of bead cores, and a belt comprised of three rubberized cord layers, among which cord layers an innermost cord layer and a middle cord layer being laminated to form a cross belt layer by crossing cords of these cord layers with each other with respect to a plane including a circumference of the tire, in which an inclination cord angle with respect to the plane in the innermost cord layer and the middle cord layer is within a given range, and cords in an outermost cord layer have a given inclination cord angle as measured from the plane toward a direction of measuring the inclination cord angle of the middle cord layer, and a coating rubber for the outermost cord layer has a given modulus of elasticity.

7 Claims, 8 Drawing Sheets

FIG_6

FIG_7a

FIG_7b

HEAVY DUTY PNEUMATIC RADIAL TIRES WITH SPECIFIED COATING RUBBER OF OUTERMOST BELT LAYER

BACKGROUND OF THE INVENTION

1. Field of the Invention

This invention relates to a heavy duty pneumatic radial tire for use in truck and bus, more particularly it relates to a heavy duty pneumatic radial tire in which a belt is comprised of three cord layers for attaining weight reduction and cord breakage in an outermost cord layer is particularly controlled to improve a durability while maintaining and improving all tire performances such as cornering property and the like.

2. Description of Related Art

Figure 8:
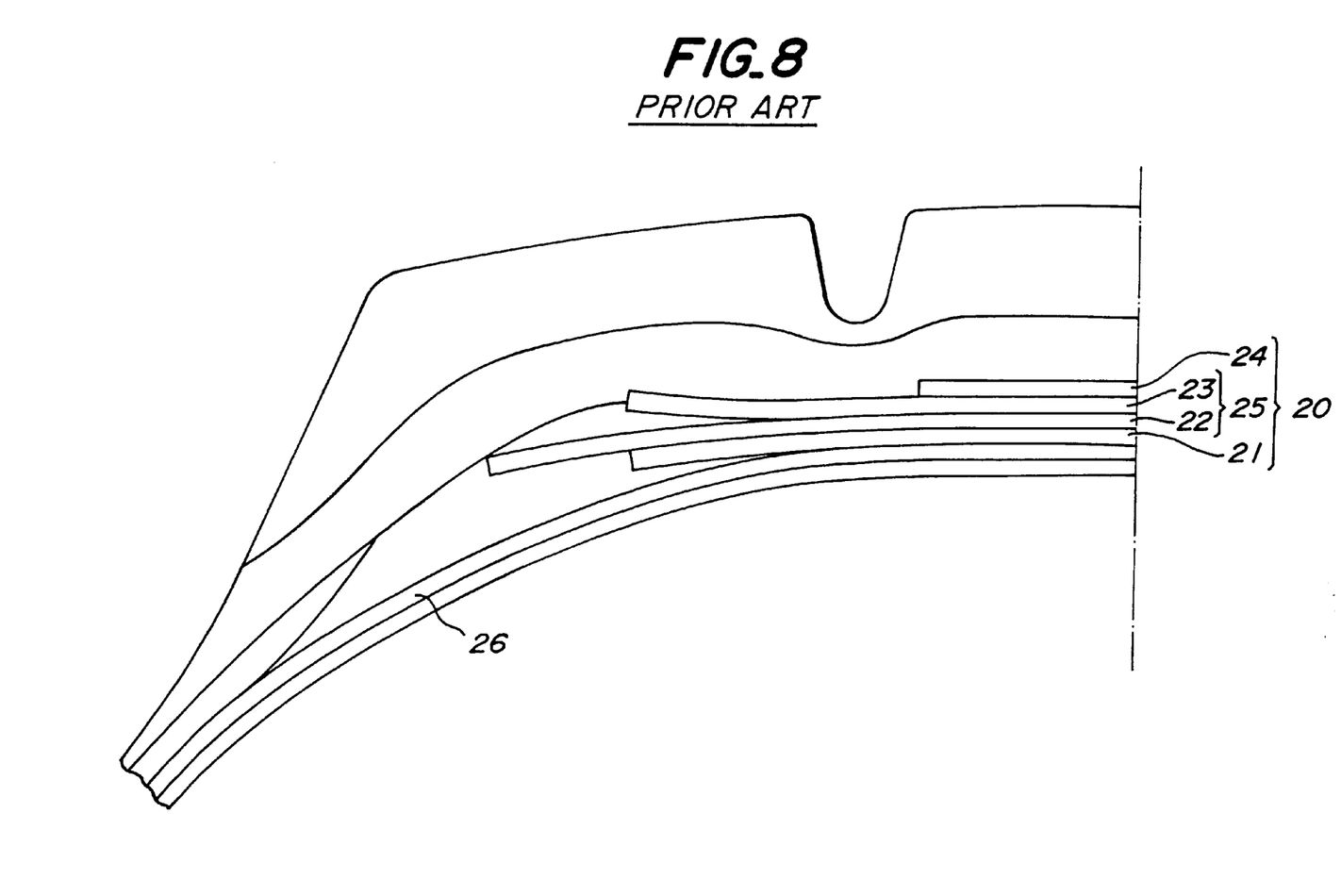
FIG. 8 is a schematically partial left-half section view of the conventional tire.

In this type of the heavy duty pneumatic radial tire for use in truck and bus, as shown in FIG. 8, a belt 20 is usually comprised of four cord layers 21–24, in which a first cord layer 21 located nearest to a carcass is arranged so as to incline cords at a relatively large cord angle with respect to a plane including a circumference of the tire (or an equatorial plane). Second and third cord layers 22, 23 are arranged to form a cross belt layer 25 by crossing cords of these layers with each other with respect to the plane including the tire circumference. A fourth cord layer 24 is arranged to incline cords in the same direction of extending the cords of the third cord layer and at a cord angle substantially equal to that of the third cord layer 23.

In the tire having such a belt 20, there is a possibility that when the tire rides on a sharp corner of rock or stone during running on a rough road of an uneven surface state scattering rocks or stones thereon, a cut failure arriving at the belt is caused. In the conventional tire, it is frequently attempted to avoid the damage due to such a cut failure (i.e. belt cord breaking-up) mainly by using an outermost cord layer or a fourth cord layer as a protection layer.

On the other hand, it has been proposed to decrease the number of the cord layers in the belt to three cord layers in the heavy duty pneumatic radial tire for attaining the weight reduction likewise passenger car tire or the like. In this case, the belt as usual is constructed by arranging cords of a first cord layer located nearest to the radial carcass at a relatively large cord angle with respect to the plane including the circumference of the tire and arranging second and third cord layers as a cross belt layer in which cords of these layers are crossed with each other with respect to the plane including the circumference of the tire and inclined at a relatively small cord angle with respect to such a plane. Such a tire is disclosed in, for example, JP-A-7-186613.

In the tire of JP-A-7-186613, there is adopted such a structure that when the belt is comprised of three breakers (corresponding to the cord layer), a tenacity per unit length of a third breaker viewed from the carcass is increased as compared with those of the remaining breakers because the tenacity of the third breaker is found out to be most lacking. This publication discloses that the above structure can cheaply and effectively prevent the occurrence of burst due to the breakage of the breaker when the tire rides on rock or stone.

As a result of the inventors' examination on the tire having such a structure, however, it has been confirmed that since the cords in the second and third breakers constituting the cross belt layer are crossed with each other at a relatively small cord angle, when a given internal pressure is applied to the tire in use, a large tension against such an internal pressure is applied to the cords in the second and third breakers and hence even if the tenacity (concretely strength at break) of the cord in the third breaker is increased at a state of applying the large tension to the third breaker, it is difficult to sufficiently control the breakage of the cord in the third breaker.

That is, when the cut failure is caused in the cord at a state of applying the above large tension, the cord is easily broken in proportion to the tension.

Figure 3:
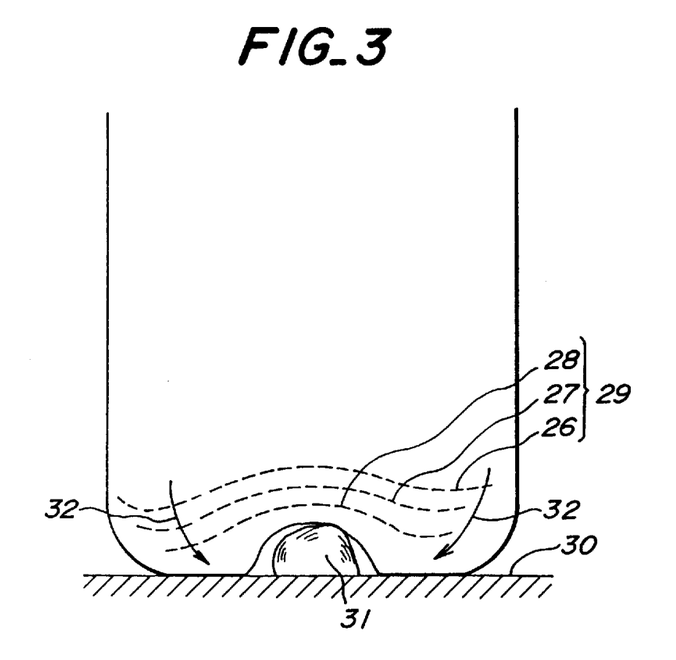
FIG. 3 is a schematic view illustrating a state of riding a tire on a projection such as a large stone or the like existing on a road surface.

Furthermore, when the tire rides on a projection 31 such as a large stone or the like existing on a road surface 30 as shown in FIG. 3, bending force is applied to the belt in a direction of an arrow 32 and hence compression force is applied to the outermost cord layer. In this case, if a modulus of elasticity of a coating rubber for the outermost cord layer 28 is small, local buckling is apt to be created in cords of the outermost cord layer 28, so that there is a fear of causing cord breaking-up when the above buckling is repeatedly applied to the cords.

SUMMARY OF THE INVENTION

It is, therefore, an object of the invention to provide a heavy duty pneumatic radial tire attaining a weight reduction by a belt comprised of three cord layers having a durability equal to that of the conventional tire having a belt comprised of four cord layers by rendering an innermost cord layer and a middle cord layer into a cross belt layer and rationalizing an inclination cord angle in these cord layers and rationalizing cords in an outermost cord layer and a coating rubber therefor to effectively control cord breaking-up of the outermost cord layer liable to be caused in such a tire while maintaining and improving all tire performances such as cornering property and the like.

According to the invention, there is the provision of in a heavy duty pneumatic radial tire comprising a radial carcass toroidally extending between a pair of bead cores each embedded in a bead portion, and a belt super-imposed about a crown portion of the carcass and reinforcing a tread portion and comprised of three rubberized cord layers, among which cord layers an innermost cord layer and a middle cord layer being laminated to form a cross belt layer by crossing cords of these cord layers with each other with respect to a plane including a circumference of the tire, the improvement wherein an inclination cord angle with respect to said plane in the innermost cord layer and the middle cord layer is within a range of 10–25°, preferably a range of 15–22°, and an inclination cord angle in an outermost cord layer is within a range of 45–115° as measured from said plane toward a direction of measuring said inclination cord angle in the middle cord layer, and a coating rubber for said outermost cord layer has a modulus of elasticity of not less than 200 kgf/mm$^2$.

Figure 7A:
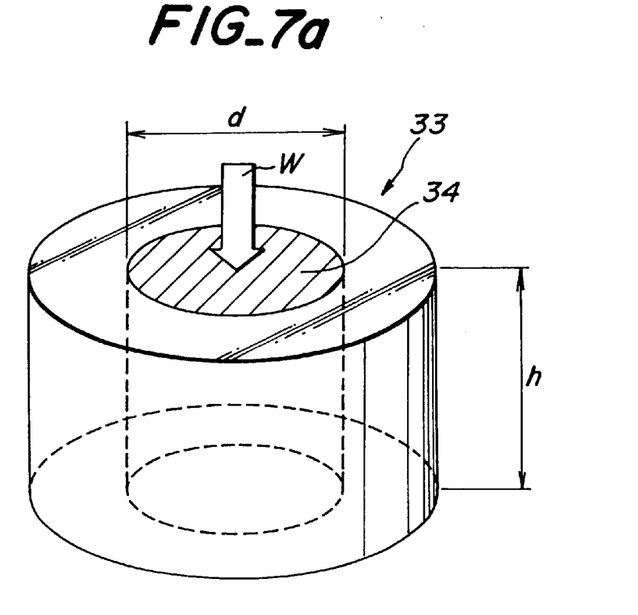
FIGS. 7a and 7b are each a diagrammatic view illustrating an apparatus and a procedure for measuring a modulus of elasticity of rubber.
Figure 7B:
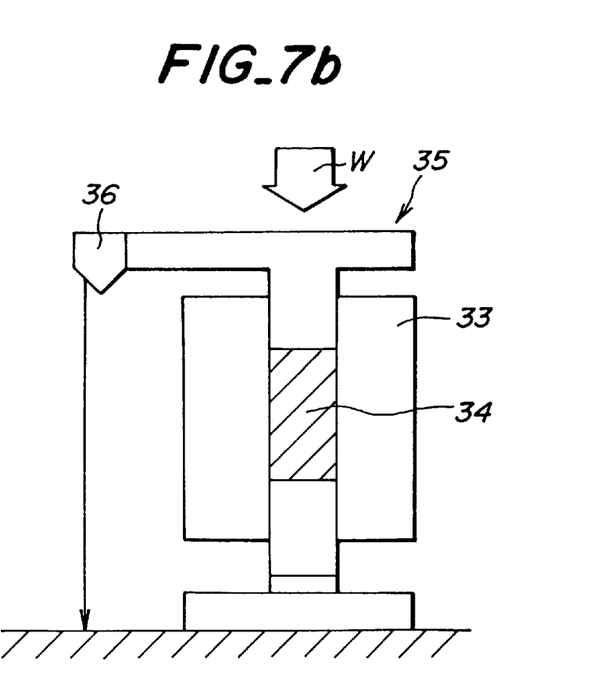

Moreover, the modulus of elasticity of rubber is defined by a value calculated from a relation between a load and a displacing quantity when a rubber specimen 34 is closely filled in a steel jig 33 having a cylindrical hollow portion of 14 mm in diameter d and 28 mm in height h as shown in FIG. 7a and thereafter the jig 33 is set onto a compression testing machine 35 as shown in FIG. 7b and then a load W is applied onto both faces of the rubber specimen 34 at a rate of 0.6 mm/min to measure a displacing quantity by means of a laser displacement meter 36.

If it is intended to control separation failure in the cross belt layer, it is preferred that an end cover made from a rubbery material is arranged to envelop an end portion of at least one of the innermost cord layer and the middle cord layer and a portion of the end cover corresponding to at least one of an inner face and an outer face of the cord layer enveloped therein has a wavy outer profile corresponding to mountain and valley located at a cord extending position and a position between cords in the cord layer and a height difference between the mountain and the valley is within a range of 0.05–0.25 mm and/or that a rubber layer covering cut cord ends is arranged on an end portion of at least one of the innermost cord layer and the middle cord layer over a full circumference thereof and has a width of 0.05–5 mm.

BRIEF DESCRIPTION OF THE DRAWINGS

The invention will be described with reference to the accompanying drawings, wherein.

DESCRIPTION OF PREFERRED EMBODIMENTS

Figure 1:
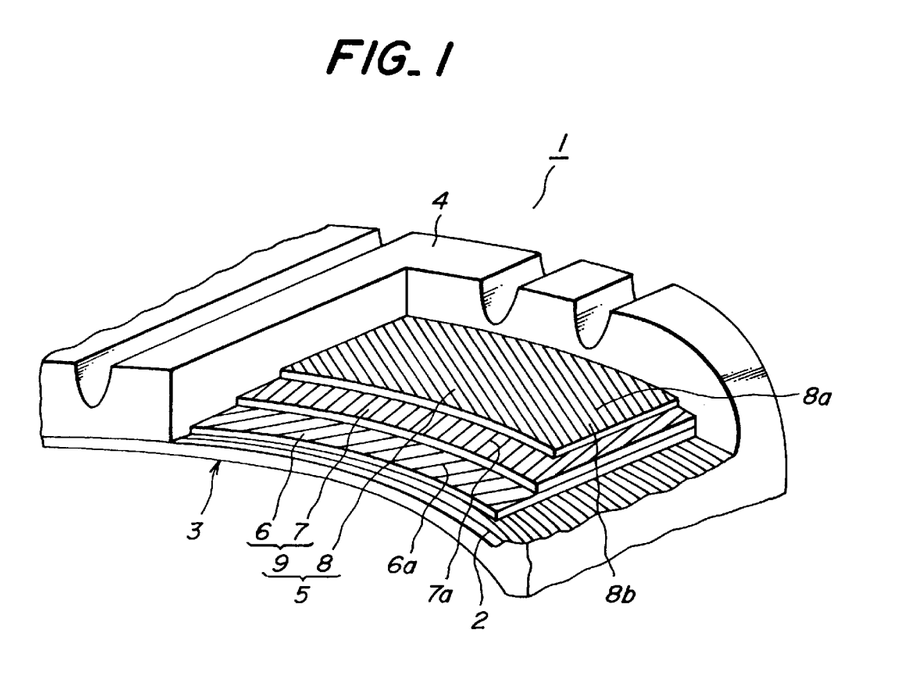
FIG. 1 is a partial perspective view of an embodiment of the heavy duty pneumatic radial tire according to the invention partially cutting away a tread portion for illustrating a belt structure.
Figure 2:
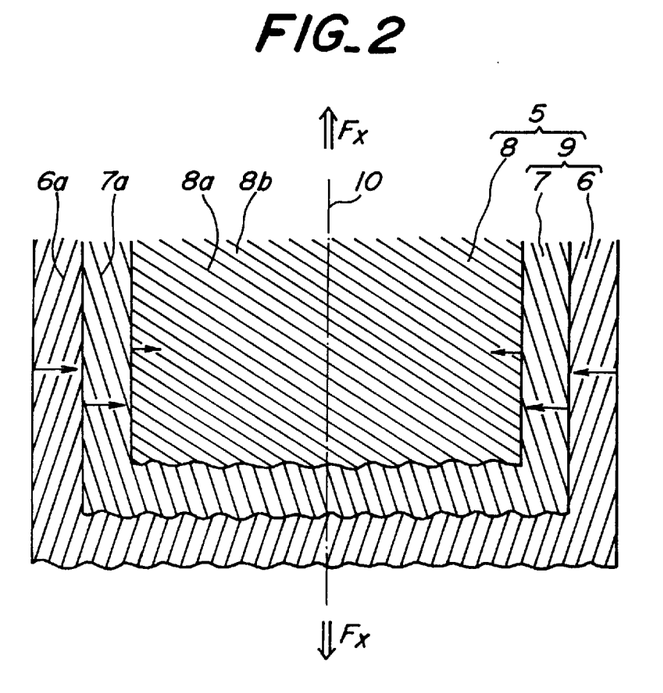
FIG. 2 is a plane view of only a belt in the belt structure of FIG. 1.

In FIG. 1 is perspectively shown a typical tread portion of the heavy duty pneumatic radial tire according to the invention partially cutting away a portion of a tread rubber for illustrating a belt structure. On the other hand, FIG. 2 is a plan view of only a belt clearly illustrating a cord arrangement of cord layers constituting the belt.

In these figures, numeral 1 is a heavy duty pneumatic radial tire, numeral 2 a radial carcass, numeral 3 a crown portion of the carcass, numeral 4 a tread portion, numeral 5 a belt, numerals 6–8 cord layers, and numeral 9 a cross belt layer.

In the illustrated tire 1, the belt 5 reinforcing the tread portion 4 is disposed on an outer circumference of the crown portion 3 in the radial carcass 2 toroidally extending between a pair of bead cores (not shown) each embedded in a bead portion (not shown). The belt 5 is comprised of three rubberized cord layers 6, 7, 8 and among them an innermost cord layer 6 and a middle cord layer 7 are laminated to cross cords of these layers with each other with respect to a plane 10 including a circumference of the tire to thereby form the cross belt layer 9.

In the above structure, the invention lies in that an inclination cord angle with respect to the plane 10 in cords 6a, 7a of the innermost cord layer 6 and the middle cord layer 7 is within 10–25°, preferably 15–22°. Cords 8a in the outermost cord layer 8 have an inclination cord angle of 45–115°, preferably 50–100° as measured from the plane 10 toward a direction of measuring the inclination cord angle of the middle cord layer 7. A coating rubber 8b for the outermost cord layer 8 has a modulus of elasticity of not less than 200 kgf/mm².

According to the above cord arrangement, the cords 6a, 7a of the innermost cord layer 6 and the middle cord layer 7 can mainly be confronted against a force Fx produced when the tire is inflated under an internal pressure and applying in the circumferential direction of the tire as shown in FIG. 2, while tension applied to the cords 8a of the outermost cord layer 8 can be slightly shifted to a compression side, so that even if the tire is subjected to cut failure arriving at the belt by treading on sharp corner of rock or stone, the cords 8a of the outermost cord layer 8 are hardly broken to improve the durability.

Also, the force Fx in the circumferential direction of the tire is applied to the belt under an inflation of internal pressure as shown in FIG. 2, so that each of the cord 6a, 7a will change in a direction of decreasing the inclination cord angle and hence the cord layers 6, 7 will shrink in the widthwise direction thereof. In the belt of the above structure, however, the inclination cord angle of the cords 8a in the outermost cord layer 8 is fairly larger than that of the cords 6a, 7a in the innermost cord layer 6 and the middle cord layer 7. Thus the change of the inclination cord angle in the cord layer 8 is very small and the cord layer 8 will hardly shrink in the widthwise direction and can not follow the shrinking deformation of the cord layers 6, 7 in the widthwise direction.

Therefore, the cord layer 8 has an action of controlling the shrinking of the cord layers 6, 7 in the widthwise direction (or so-called propping action) to increase the rigidity of the cord layers 6, 7 in the circumferential direction. This becomes advantageous in a point that the growth of the tire is controlled in the inflation under internal pressure while increasing the cornering power (CP).

Also, it is favorable that the inclination cord angles of the cords 6a, 7a with respect to the plane 10 are made substantially equal in the innermost cord layer 6 and the middle cord layer 7 in order that tension is equally born by these cords 6a, 7a. On the other hand, the reason why the inclination cord angle of the cords 6a, 7a is within a range of 10–25° is due to the fact that when the above angle exceeds 25°, the cords 6a, 7a can not sufficiently be confronted against the tension in the circumferential direction of the tire. When it is less than 10°, interlaminar shearing strain produced in end portions of the cord layers 6 and 7 becomes larger and separation failure is apt to be caused between the cord layers 6 and 7 (in the cross belt layer).

Figure 9:
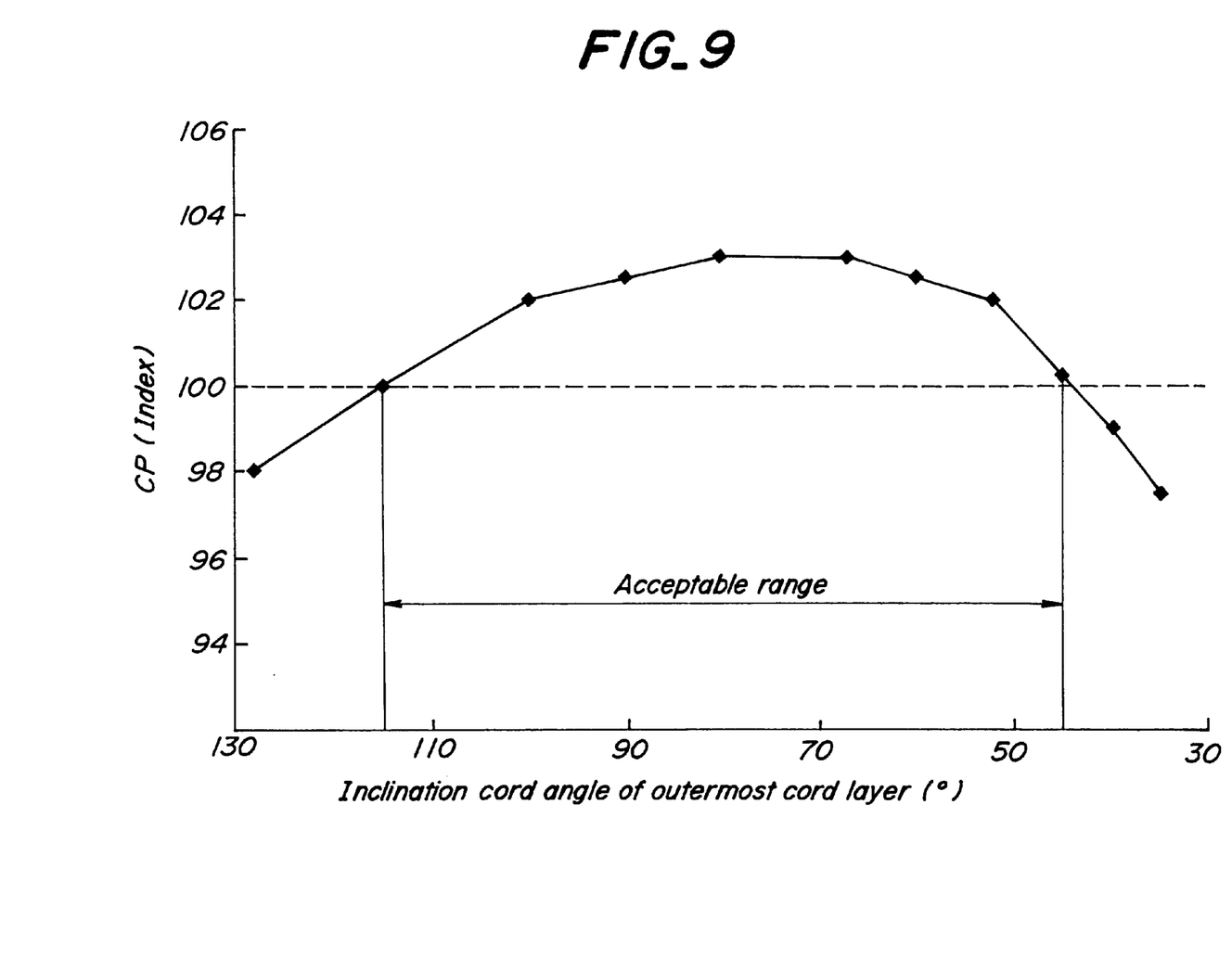
FIG. 9 is a graph showing a relation between inclination cord angle of outermost cord layer and cornering power (CP).

In FIG. 9 illustrates a relation between the inclination cord angle of the cords 8a in the outermost cord layer 8 and cornering power (CP), in which the value of the cornering power is represented by an index on the basis that the conventional tire having four cord layer as a belt is 100.

As seen from FIG. 9, the tires having an inclination cord angle in the outermost cord layer 8 of 45–115° have the cornering power larger than that of the conventional tire. This is considered due to the fact that the outermost cord layer 8 develops the sufficient propping action to thereby enhance the rigidity of the cross belt layer in the circumferential direction.

In the invention, therefore, the inclination cord angle of the cords 8a in the outermost cord layer 8 is within a range of 45–115°.

In the above structure, when the tire tread on a projection such as a large stone or the like existing on a road surface to apply compression force to the cords 8a of the outermost cord layer 8 in the belt in an inward bending direction as shown in FIG. 3, there is a possibility that local buckling is created in the cords 8a of the outermost cord layer 8 to finally cause cord breaking-up.

For this end, the heavy duty pneumatic radial tire according to the invention has a further essential feature that a coating rubber 8b for the outermost cord layer 8 has a modulus of elasticity of not less than 200 kgf/mm$^2$. In this way, buckling is hardly caused even at the state as shown in FIG. 3 and the breaking of the cords 8a in the outermost cord layer 8 can be sufficiently controlled, and hence the durability which is liable to be lacking when the belt is comprised of three cord layer for reducing the weight can successfully be increased to the same level as the durability in the conventional tire having a belt comprised of four cord layers.

Figure 4:
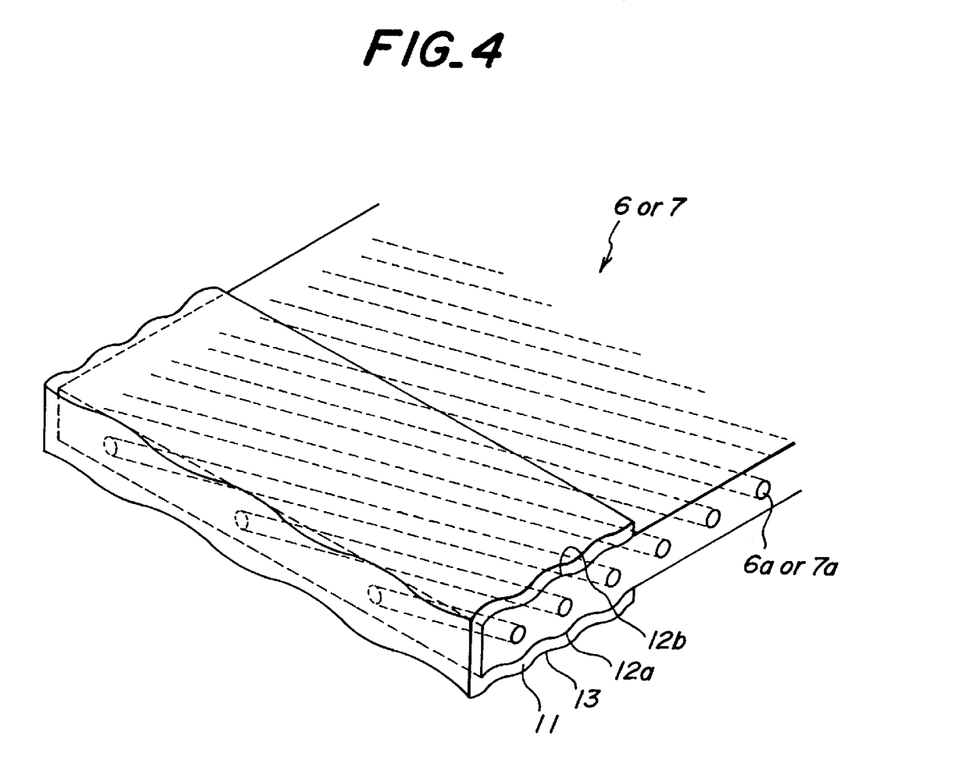
FIG. 4 is a partial perspective view illustrating a state of arranging an end cover on an end portion of an innermost cord layer and/or a middle cord layer.
Figure 5:
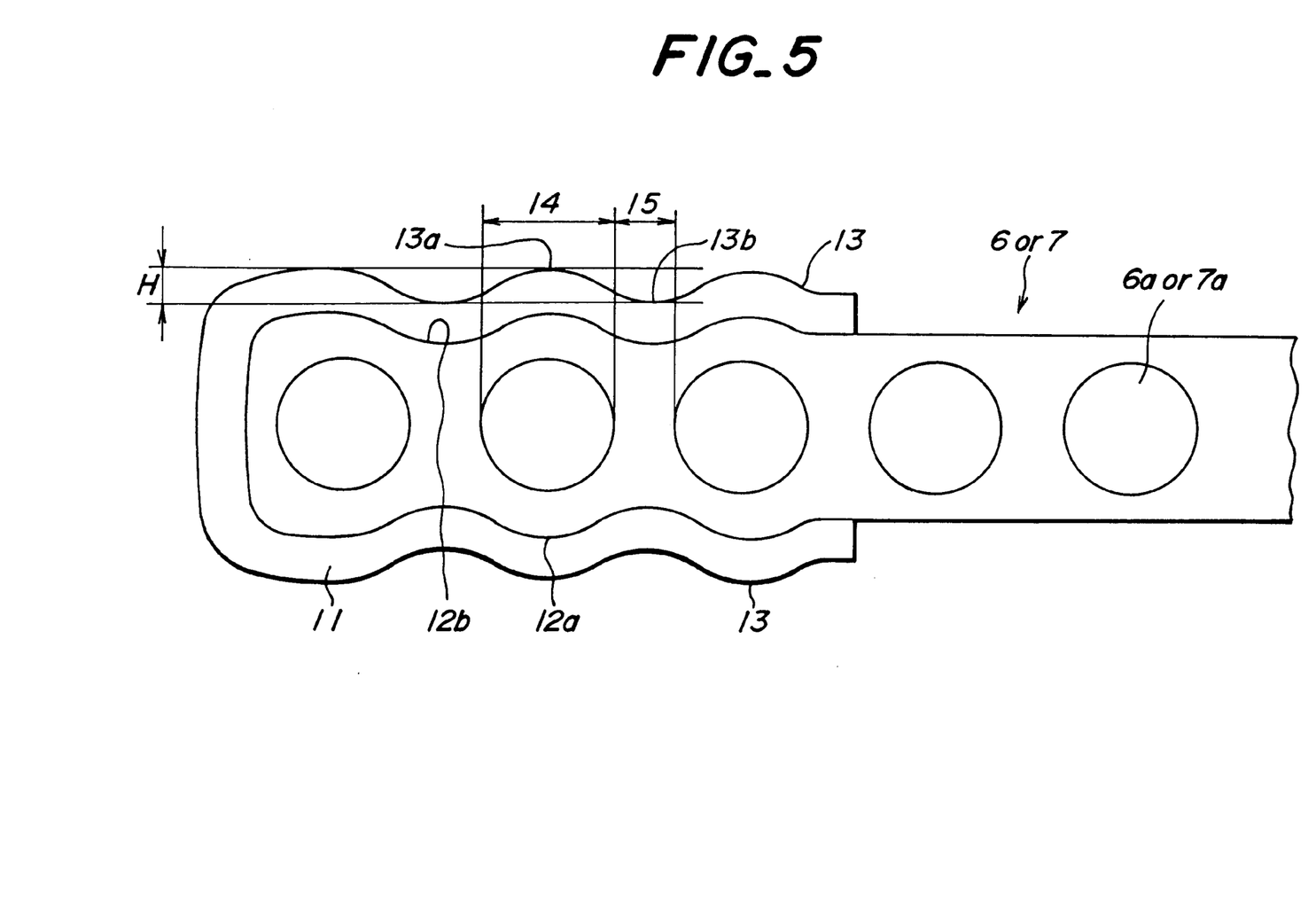
FIG. 5 is an enlarged schematic view of a main part of an innermost cord layer and/or a middle cord layer enveloped with an end cover at section in a widthwise direction of the tire.

In another embodiment of the invention, an end cover 11 made from a rubbery material is arranged on an end portion of at least one of the innermost cord layer 6 and the middle cord layer 7 so as to envelop the end portion with the end cover as shown in FIGS. 4 and 5. A portion of the end cover 11 corresponding to at least one of an inner face 12a and an outer face 12b of the cord layer 6, 7 enveloped therein has a wavy outer profile 13 corresponding to mountain 13a and valley 13b located at a cord extending position 14 (more strictly a cord center position) and a position 15 between cords (more strictly center position of a distance between cord centers) in the cord layer 6, 7 and a height difference H between the mountain and the valley is within a range of 0.05–0.25 mm. In this case, the separation failure in the cross belt layer can particularly be controlled and hence the durability of the tire is more improved.

The reason why the height difference H between mountain and valley in the wavy outer profile of the end cover 11 is limited to a range of 0.05–0.25 mm is due to the fact that when the difference H is less than 0.05 mm, the effect of controlling the separation failure in the cross belt layer (concretely between the innermost cord layer 6 and the middle cord layer 7) is lessened. When it exceeds 0.25 mm, air is apt to be gathered in the valley portion at a step of adhering and building the belt, and if air is gathered, rubber is not adhered in this portion and the separation resistance deteriorates.

Preferably, the end cover 11 having the wavy outer profile is formed by pressing an uncured cord layer containing rubberized cords from front and back surfaces thereof with a roll similar to a comb roll used for arranging many cords in a given direction just before rubberization when the uncured cord layer is produced through calendar rolls, or by thinning a gauge of an uncured coating rubber as far as possible. In the latter case, it is required to set a rubber gauge to a certain thickness because when the rubber gauge is too thin, the cords are apt to be exposed from the coating rubber and if the exposed cords are existent, adhesion breakage is liable to be caused.

Figure 6:
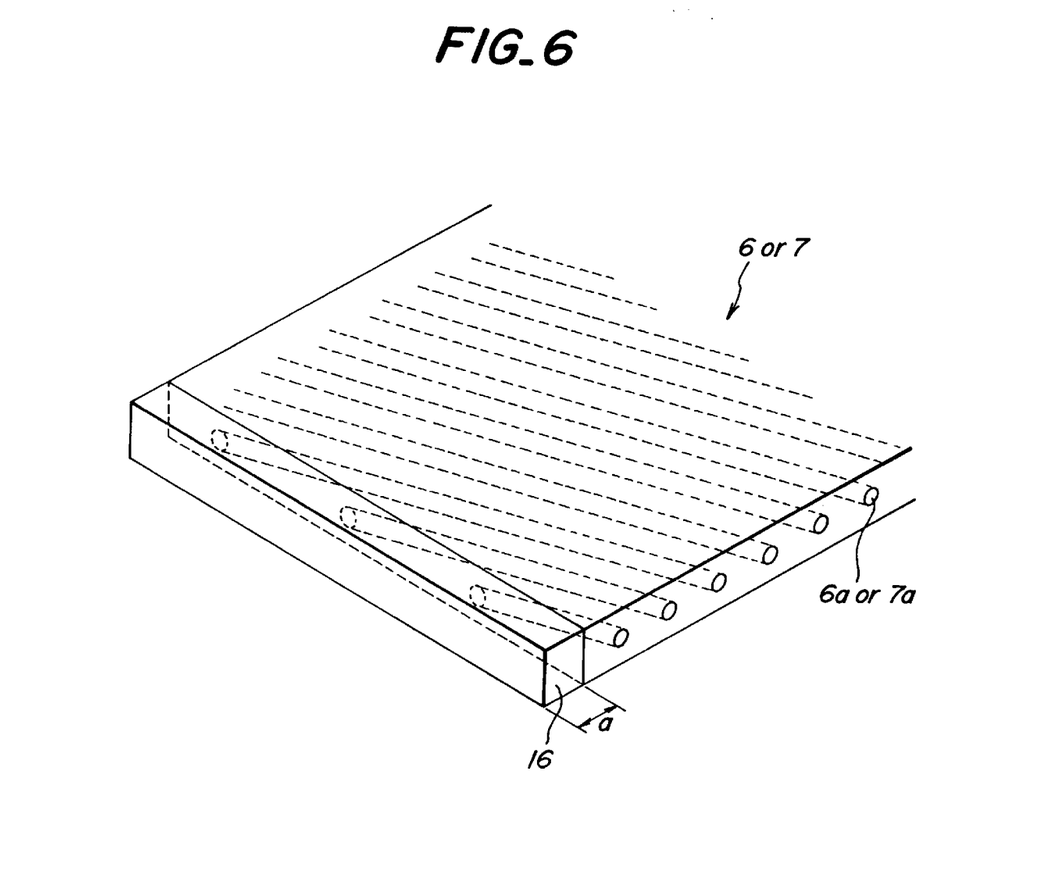
FIG. 6 is a partial perspective view illustrating a state of arranging a rubber layer on an end portion of an innermost cord layer and/or a middle cord layer.

In the other embodiment of the invention, it is favorable that a rubber layer 16 covering cut cord ends is arranged on an end portion of at least one of the innermost cord layer 6 and the middle cord layer 7 over a full circumference thereof instead of the above end cover as shown in FIG. 6 and a width a thereof is within a range of 0.05–5 mm. Even in this case, the separation failure in the cross belt layer can particularly be controlled and hence the durability of the tire is further improved.

The reason why the width a of the rubber layer 16 is limited to a range of 0.05–5 mm is due to the fact that when the width is less than 0.05 mm, the effect of controlling the separation failure in the cross belt layer is lessened. When it exceeds 5 mm, the rubber layer hangs down or tears up in the pushing of the belt from a belt pushing apparatus and hence inconveniences are apt to be caused in the building up of the belt though there are not particularly caused problems in the performances by widening width of the rubber layer.

Moreover, the rubber layer 16 may be used alone or may be used together with the end cover 11. In the latter case, the outer profile of the end cover 11 is not necessarily wavy. In the rubber layer 16, it is favorable to use the same compounding composition as in a coating rubber for the cord layers 6 and 7 from a viewpoint of the productivity.

Although only one embodiment of the invention has been disclosed, it is apparent that other embodiments and modifications are possible within a scope of the invention.

The following examples are given in illustration of the invention and are not intended as limitations thereof.

Various heavy duty pneumatic radial tires according to the invention are prepared and the performances thereof are evaluated as mentioned below.

Each of these tires has a tire size of 11R22.5 and comprises a belt 5 comprised of three cord layers 6–8 as shown in FIG. 1, in which steel cord of 1+6×0.34 is used as each of cords 6a, 7a and 8a of the cord layers 6–8 and an end count in the cord layer is 18.0 cords/50 mm.

The inclination cord angle in each of the cord layers 6–8 (1B–3B) and a modulus of elasticity of a coating rubber 8b for the outermost cord layer 8 are shown in Table 1.

A carcass 1 is comprised of one rubberized ply containing steel cords of 3+9+15×0.175 arranged in a radial direction of the tire. The other structure of the tire is substantially the same as in the conventional pneumatic radial tire for truck and bus.

For comparison, there are also shown a tire having a belt comprised of four cord layers (conventional example), tires having either an inclination cord angle in the belt outside the range defined in the invention or a modulus of elasticity of a coating rubber for the outermost cord layer outside the range defined in the invention or both (Comparative Examples 1–6).

The durability of each of the above tires is evaluated by the following three tests to obtain results as shown in Table 1. Further, the cornering power is measured, from which the cornering property is evaluated.

A: Test for cut failure of belt

A test tire inserting a iron filler having an angled tip portion of 90° into a rib groove nearest to a crown center portion of the tire or rendering into so-called stone bitten state is inflated under an internal pressure of 7.5 kgf/cm$^2$ and run under a load of 2750 kgf over a distance of 10,000 km. Thereafter, the tire is dissected to measure whether or not the cords of the outermost cord layer are broken. Durability is evaluated by the presence or absence of cord breaking-up.

B: Test for cord breaking-up of outermost cord layer

A test tire inflated under an internal pressure of 7.5 kgf/cm$^2$ is placed on a drum provided on its surface with a semi-sphere having a radius of 30R located at a position substantially corresponding to a central portion of a tread in the widthwise direction of the tire and run under a load of 2750 kgf over a distance of 10,000 km. Thereafter, the tire is dissected to measure whether or not the cords of the outermost cord layer are broken. Durability is evaluated by the presence or absence of cord breaking-up.

C: Test for durability of cross belt layer

A test tire inflated at an internal pressure of 7.5 kgf/cm$^2$ is run under a load of 2750 kgf at a state of applying a lateral force of 0.3 G over a distance of 1,000 km. Thereafter, the tire is dissected to measure a crack length created in an end portion of the middle cord layer. Durability is evaluated by the measured crack length.

In Table 1, the performance is represented by an index value on the basis that the conventional example is 100. The larger the index value, the better the performance.

D: Test for evaluation of cornering property

A test tire mounted onto a rim having a size of 8.25 and inflated under an internal pressure of 7.5 kgf/cm$^2$ is run on a drum under a load of 2750 kgf, during which a slip angle is given every 1° within a range of 1–4° and lateral force at each slip angle is measured to calculate a cornering power. The cornering property is evaluated by an average of the calculated cornering powers.

test C, and also have a cornering property equal to or more than that of the conventional example.

On the contrary, the tires of Comparative Examples 1–6 are poor in either the durability or the cornering property or both.

As mentioned above, according to the invention, it is possible to improve the durability while maintaining and improving all tire performances such as cornering property and the like in the heavy duty pneumatic radial tire having three cord layers as a belt for reducing tire weight.

What is claimed is:

1. In a heavy duty pneumatic radial tire comprising a radial carcass toroidally extending between a pair of bead cores each embedded in a bead portion, and a belt superimposed about a crown portion of the carcass and reinforc-

TABLE 1

| | Number of cord layers | Inclination cord angle (°) | | | | Modulus of elasticity of coating rubber 8b (kgf/cm$^2$) | Height difference H between mountain and valley (mm) | Width a of rubber layer (mm) | A: Cut test | B: Test for cord breaking-up | C: Durability test | D: Cornering test |
|---|---|---|---|---|---|---|---|---|---|---|---|---|
| | | 1B | 2B | 3B | 4B | | | | | | | |
| Conventional Example | 4 | R52 | R18 | L18 | L18 | 170 | 0 | 0 | no cut failure | no cord breaking-up | 100.0 | 100.0 |
| Comparative Example 1 | 3 | R52 | R18 | L18 | — | 170 | 0 | 0 | cut failure occurred | no cord breaking-up | 100.0 | 100.0 |
| Comparative Example 2 | 3 | R18 | L18 | R52 | — | 170 | 0 | 0 | no cut failure | no cord breaking-up | 97.0 | 98.0 |
| Comparative Example 3 | 3 | R18 | L18 | L52 | — | 170 | 0 | 0 | no cut failure | cord breaking-up occurred | 105.0 | 102.0 |
| Comparative Example 4 | 3 | R 9 | L 9 | L52 | — | 350 | 0 | 0 | no cut failure | no cord breaking-up | 98.0 | 99.5 |
| Comparative Example 5 | 3 | R18 | L18 | L40 | — | 350 | 0 | 0 | no cut failure | no cord breaking-up | 104.5 | 99.0 |
| Comparative Example 6 | 3 | R28 | L28 | L52 | — | 350 | 0 | 0 | no cut failure | no cord breaking-up | 105.0 | 98.5 |
| Example 1 | 3 | R18 | L18 | L52 | — | 350 | 0 | 0 | no cut failure | no cord breaking-up | 105.0 | 102.0 |
| Example 2 | 3 | R18 | L18 | L52 | — | 200 | 0 | 0 | no cut failure | no cord breaking-up | 105.0 | 102.0 |
| Example 3 | 3 | R18 | L18 | L52 | — | 350 | 0.05 | 0 | no cut failure | no cord breaking-up | 108.0 | 102.0 |
| Example 4 | 3 | R18 | L18 | L52 | — | 350 | 0.15 | 0 | no cut failure | no cord breaking-up | 110.0 | 102.0 |
| Example 5 | 3 | R18 | L18 | L52 | — | 350 | 0.25 | 0 | no cut failure | no cord breaking-up | 115.0 | 102.0 |
| Example 6 | 3 | R18 | L18 | L52 | — | 350 | 0 | 0.05 | no cut failure | no cord breaking-up | 120.0 | 102.0 |
| Example 7 | 3 | R18 | L18 | L52 | — | 350 | 0 | 0.05 | no cut failure | no cord breaking-up | 123.0 | 102.0 |
| Example 8 | 3 | R18 | L18 | L45 | — | 350 | 0 | 0 | no cut failure | no cord breaking-up | 105.0 | 100.0 |
| Example 9 | 3 | R18 | L18 | L60 | — | 350 | 0 | 0 | no cut failure | no cord breaking-up | 105.0 | 102.5 |
| Example 10 | 3 | R10 | L10 | L52 | — | 350 | 0 | 0 | no cut failure | no cord breaking-up | 100.0 | 100.0 |
| Example 11 | 3 | R15 | L15 | L52 | — | 350 | 0 | 0 | no cut failure | no cord breaking-up | 104.0 | 102.0 |
| Example 12 | 3 | R22 | L22 | L52 | — | 350 | 0 | 0 | no cut failure | no cord breaking-up | 106.0 | 101.0 |
| Example 13 | 3 | R25 | L25 | L52 | — | 350 | 0 | 0 | no cut failure | no cord breaking-up | 106.0 | 100.0 |
| Example 14 | 3 | R25 | L25 | R65 | — | 350 | 0 | 0 | no cut failure | no cord breaking-up | 100.0 | 100.0 |

As seen from the results of Table 1, the tires of Examples 1–14 maintain a sound state without breaking the cords of the outermost cord layer in the tests A and B, and are superior in the durability to the conventional example in the ing a tread portion and comprised of three rubberized cord layers, among which cord layers an innermost cord layer and a middle cord layer being laminated to form a cross belt layer by crossing cords of these cord layers with each other with respect to a plane including a circumference of the tire, the improvement wherein an inclination cord angle with respect to said plane in the innermost cord layer and the middle cord layer is within a range of 10–25°, and an inclination cord angle in an outermost cord layer is within a range of 45–115° as measured from said plane toward a direction of measuring said inclination cord angle of the middle cord layer, and a coating rubber for said outermost cord layer has a modulus of elasticity of not less than 200 kgf/mm$^2$.

2. A heavy duty pneumatic radial tire according to claim 1, wherein an end cover made from a rubbery material is arranged so as to envelop an end portion of at least one of the innermost cord layer and the middle cord layer and a portion of the end cover covering at least one of an inner face and an outer face of the cord layer enveloped therein has a wavy outer profile forming a mountain and valley located at a cord center position and a center position of a distance between cords in the cord layer and a height difference between the mountain and the valley is within a range of 0.05–0.25 mm.

3. A heavy duty pneumatic radial tire according to claim 2, wherein a rubber layer covering cut cord ends is arranged on an end portion of at least one of the innermost cord layer and the middle cord layer over a full circumference thereof and has a width of 0.05–5 mm.

4. A heavy duty pneumatic radial tire according to claim 1, wherein a rubber layer covering cut cord ends is arranged on an end portion of at least one of the innermost cord layer and the middle cord layer over a full circumference thereof and has a width of 0.05–5 mm.

5. A heavy duty pneumatic radial tire according to claim 1, wherein the inclination cord angle in said outermost cord layer is within a range of 50–100°.

6. A heavy duty pneumatic radial tire according to claim 1, wherein the inclination cord angle in said middle cord layer is within a range of 15–22°.

7. A heavy duty pneumatic radial tire according to claim 1, wherein the cord angles of the cords in said innermost cord layer and said middle cord layer are substantially equal.

* * * * *